US009170870B1

(12) United States Patent
Masterson et al.

(10) Patent No.: US 9,170,870 B1
(45) Date of Patent: Oct. 27, 2015

(54) DEVELOPMENT AND TESTING OF PAYLOAD RECEIPT BY A PORTABLE ELECTRONIC DEVICE (71) Applicant: Sprint Communications Company L.P., Overland Park, KS (US)

(72) Inventors: Michelle E. Masterson, Overland Park, KS (US); Dale S. Schempp, Lenexa, KS (US); Bret Dean Sumner, Lawrence, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 149 days.

(21) Appl. No.: 14/010,523

(22) Filed: Aug. 27, 2013

(51) Int. Cl.
*G06F 11/00* (2006.01)
*G06F 11/07* (2006.01)
*G06F 11/22* (2006.01)

(52) U.S. Cl.
CPC ........ *G06F 11/0748* (2013.01); *G06F 11/0766* (2013.01); *G06F 11/2205* (2013.01); *G06F 11/2289* (2013.01); *G06F 11/2294* (2013.01)

(58) Field of Classification Search
CPC ............ G06F 11/0748; G06F 11/0766; G06F 11/2205; G06F 11/2289; G06F 11/2294; G06F 11/26
USPC ......... 714/32, 25, 27, 33, 37, 38.1, 38.14, 41, 714/47.1
See application file for complete search history.

(56) References Cited

U.S. PATENT DOCUMENTS

| | | | |
|---|---|---|---|
| 6,131,024 A | 10/2000 | Boltz | |
| 7,165,191 B1 * | 1/2007 | Vakrat | 714/38.1 |
| 7,266,371 B1 | 9/2007 | Amin et al. | |
| 7,493,111 B2 | 2/2009 | Knowles | |
| 7,817,988 B2 | 10/2010 | Kruis et al. | |
| 7,904,895 B1 | 3/2011 | Cassapakis et al. | |
| 8,107,926 B2 | 1/2012 | Goto | |
| 8,185,101 B1 | 5/2012 | Wiseman et al. | |
| 8,260,281 B2 | 9/2012 | Urbanek | |
| 8,401,538 B2 | 3/2013 | Urbanek | |
| 8,401,595 B2 | 3/2013 | Zhu et al. | |
| 8,433,953 B1 * | 4/2013 | Gaudette et al. | 714/33 |
| 8,442,521 B2 | 5/2013 | Fleischman et al. | |
| 8,571,536 B2 | 10/2013 | Urbanek | |

(Continued)

FOREIGN PATENT DOCUMENTS

| | | |
|---|---|---|
| WO | WO2012078753 A1 | 6/2012 |
| WO | WO2013169983 A1 | 11/2013 |
| WO | WO2014046814 A1 | 3/2014 |
| WO | WO2014113128 A1 | 7/2014 |
| WO | WO2014123758 A1 | 8/2014 |

(Continued)

OTHER PUBLICATIONS

Advisory Action dated Dec. 17, 2014, U.S. Appl. No. 13/622,234, filed Sep. 18, 2012.

(Continued)

*Primary Examiner* — Joseph D Manoskey (57) ABSTRACT

Systems and methods disclosed herein enable a telecommunications service provider to send test files to a device that contain a set of setting options for information nodes. The device, for example, an application on the device, receives at least one test file and inputs the test file. A single test file or a series of test files may be sent to a device to ensure that the device can receive an active payload once the device has been activated. A notification may be sent by the application to confirm receipt, inputting, and/or post-input operation of one or more test files.

20 Claims, 6 Drawing Sheets

(56) References Cited

U.S. PATENT DOCUMENTS

| | | | |
|---|---|---|---|
| 8,612,967 B1 | 12/2013 | Delker | |
| 8,626,165 B1 | 1/2014 | Narasimhan et al. | |
| 8,666,383 B1 | 3/2014 | Mauer et al. | |
| 8,825,039 B2 | 9/2014 | Mizuguchi | |
| 8,909,291 B1 | 12/2014 | Spanel et al. | |
| 9,026,105 B2 | 5/2015 | Shipley et al. | |
| 9,042,877 B1 | 5/2015 | Ghoshal et al. | |
| 2002/0091931 A1 | 7/2002 | Quick, Jr. et al. | |
| 2003/0217145 A1 | 11/2003 | Leung et al. | |
| 2004/0033798 A1 | 2/2004 | Robin et al. | |
| 2004/0092248 A1 | 5/2004 | Kelkar et al. | |
| 2004/0093109 A1 | 5/2004 | O'Connor et al. | |
| 2004/0116163 A1 | 6/2004 | Kim et al. | |
| 2004/0137890 A1 | 7/2004 | Kalke | |
| 2004/0137891 A1 | 7/2004 | Clark et al. | |
| 2004/0261041 A1 | 12/2004 | Parakkuth et al. | |
| 2005/0079855 A1 | 4/2005 | Jethi et al. | |
| 2005/0085222 A1 | 4/2005 | Przybilski et al. | |
| 2005/0119001 A1 | 6/2005 | Watanabe | |
| 2005/0188262 A1* | 8/2005 | Rosenman et al. | 714/25 |
| 2005/0197098 A1 | 9/2005 | Trossen | |
| 2006/0025151 A1 | 2/2006 | Karaoguz et al. | |
| 2006/0135144 A1 | 6/2006 | Jothipragasam | |
| 2006/0154651 A1 | 7/2006 | Knowles | |
| 2006/0203722 A1 | 9/2006 | Oommen | |
| 2006/0208071 A1 | 9/2006 | Chang et al. | |
| 2006/0235944 A1* | 10/2006 | Haslam | 709/217 |
| 2006/0236325 A1 | 10/2006 | Rao et al. | |
| 2006/0246949 A1 | 11/2006 | Gupta et al. | |
| 2007/0004404 A1 | 1/2007 | Buckley et al. | |
| 2007/0082655 A1 | 4/2007 | Link, II et al. | |
| 2007/0099599 A1 | 5/2007 | Smith et al. | |
| 2007/0129057 A1 | 6/2007 | Xu et al. | |
| 2007/0130156 A1 | 6/2007 | U. Tenhunen et al. | |
| 2007/0165654 A1 | 7/2007 | Chai et al. | |
| 2007/0169084 A1 | 7/2007 | Frank et al. | |
| 2007/0190939 A1 | 8/2007 | Abel | |
| 2007/0197234 A1 | 8/2007 | Gill et al. | |
| 2007/0250645 A1 | 10/2007 | Meadows et al. | |
| 2007/0254635 A1 | 11/2007 | Montelius | |
| 2008/0039114 A1 | 2/2008 | Phatak et al. | |
| 2008/0046583 A1 | 2/2008 | Rao | |
| 2008/0046880 A1 | 2/2008 | Jun et al. | |
| 2008/0046997 A1 | 2/2008 | Wang | |
| 2008/0062900 A1 | 3/2008 | Rao | |
| 2008/0065753 A1 | 3/2008 | Rao | |
| 2008/0109662 A1 | 5/2008 | Natarajan et al. | |
| 2008/0146280 A1 | 6/2008 | Sasse et al. | |
| 2008/0167027 A1 | 7/2008 | Gautier et al. | |
| 2008/0171532 A1 | 7/2008 | Shieh et al. | |
| 2008/0225806 A1 | 9/2008 | Arian et al. | |
| 2008/0281511 A1 | 11/2008 | Miyata | |
| 2008/0318547 A1 | 12/2008 | Ballou, Jr. et al. | |
| 2009/0061840 A1 | 3/2009 | Fleischman et al. | |
| 2009/0093242 A1 | 4/2009 | Bhalekar et al. | |
| 2009/0094350 A1 | 4/2009 | Rive et al. | |
| 2009/0106200 A1 | 4/2009 | Salinas et al. | |
| 2009/0124250 A1* | 5/2009 | Topaltzas et al. | 455/423 |
| 2009/0156209 A1 | 6/2009 | Franklin et al. | |
| 2009/0239518 A1 | 9/2009 | Feuillette | |
| 2009/0247124 A1 | 10/2009 | de Atley et al. | |
| 2009/0260004 A1 | 10/2009 | Datta et al. | |
| 2009/0307763 A1* | 12/2009 | Rawlins et al. | 726/5 |
| 2010/0048193 A1 | 2/2010 | Ortion et al. | |
| 2010/0060456 A1 | 3/2010 | Forster | |
| 2010/0075669 A1 | 3/2010 | Sparks et al. | |
| 2010/0080143 A1* | 4/2010 | Topaltzas et al. | 370/253 |
| 2010/0133335 A1 | 6/2010 | Maguid et al. | |
| 2010/0136960 A1 | 6/2010 | Knezevic | |
| 2010/0159876 A1 | 6/2010 | Brown et al. | |
| 2010/0161724 A1 | 6/2010 | Sathyan et al. | |
| 2010/0167696 A1 | 7/2010 | Smith et al. | |
| 2010/0192120 A1 | 7/2010 | Raleigh | |
| 2010/0203864 A1 | 8/2010 | Howard | |
| 2010/0207742 A1 | 8/2010 | Buhot et al. | |
| 2010/0222047 A1 | 9/2010 | Vanderlinden et al. | |
| 2010/0262638 A1 | 10/2010 | Fitzgerald | |
| 2010/0291898 A1 | 11/2010 | Sanding et al. | |
| 2010/0311404 A1 | 12/2010 | Shi et al. | |
| 2010/0312794 A1* | 12/2010 | Liu | 707/770 |
| 2010/0325622 A1 | 12/2010 | Morton | |
| 2010/0332639 A1 | 12/2010 | Diaz et al. | |
| 2011/0003590 A1 | 1/2011 | Yoon et al. | |
| 2011/0014913 A1 | 1/2011 | Yoon et al. | |
| 2011/0026501 A1 | 2/2011 | Sharaga et al. | |
| 2011/0028138 A1 | 2/2011 | Davies-Moore et al. | |
| 2011/0030062 A1 | 2/2011 | Hsu et al. | |
| 2011/0035421 A1 | 2/2011 | Laird-McConnell et al. | |
| 2011/0081885 A1 | 4/2011 | Sennett et al. | |
| 2011/0119716 A1 | 5/2011 | Coleman, Sr. | |
| 2011/0138074 A1 | 6/2011 | Onda et al. | |
| 2011/0161659 A1 | 6/2011 | Himawan et al. | |
| 2011/0165836 A1 | 7/2011 | Dixon et al. | |
| 2011/0208338 A1 | 8/2011 | Eteminan et al. | |
| 2011/0230136 A1 | 9/2011 | Washiro | |
| 2011/0258249 A1 | 10/2011 | Biggs et al. | |
| 2011/0263294 A1 | 10/2011 | Kim et al. | |
| 2011/0296399 A1 | 12/2011 | Tugnawat et al. | |
| 2011/0306318 A1 | 12/2011 | Rodgers et al. | |
| 2011/0314129 A1 | 12/2011 | Rezaiifar et al. | |
| 2012/0027059 A1 | 2/2012 | Zhao et al. | |
| 2012/0036282 A1 | 2/2012 | Chen et al. | |
| 2012/0046022 A1 | 2/2012 | Kalke et al. | |
| 2012/0047227 A1 | 2/2012 | Haggerty et al. | |
| 2012/0094684 A1 | 4/2012 | Reddy | |
| 2012/0106509 A1 | 5/2012 | Klingenbrunn et al. | |
| 2012/0129513 A1 | 5/2012 | van der Laak | |
| 2012/0129572 A1 | 5/2012 | Johnstone et al. | |
| 2012/0135733 A1 | 5/2012 | Cormier et al. | |
| 2012/0158580 A1 | 6/2012 | Eram et al. | |
| 2012/0203824 A1 | 8/2012 | Oommen | |
| 2012/0208511 A1 | 8/2012 | Vanderlinden et al. | |
| 2012/0230587 A1* | 9/2012 | Arseneau | 382/182 |
| 2012/0260095 A1 | 10/2012 | Von Hauck et al. | |
| 2012/0276872 A1 | 11/2012 | Knauth et al. | |
| 2012/0282891 A1 | 11/2012 | Mohammed et al. | |
| 2012/0282924 A1 | 11/2012 | Tagg et al. | |
| 2013/0023235 A1 | 1/2013 | Fan et al. | |
| 2013/0031191 A1 | 1/2013 | Bott | |
| 2013/0031234 A1 | 1/2013 | Alfano et al. | |
| 2013/0046951 A1 | 2/2013 | Jones | |
| 2013/0065578 A1 | 3/2013 | Raleigh et al. | |
| 2013/0072168 A1 | 3/2013 | Colucciello et al. | |
| 2013/0085914 A1 | 4/2013 | McPherson et al. | |
| 2013/0111461 A1 | 5/2013 | Zubas et al. | |
| 2013/0198567 A1* | 8/2013 | Ahmed et al. | 714/32 |
| 2013/0222395 A1 | 8/2013 | Blas, Jr. | |
| 2013/0303142 A1 | 11/2013 | Burcham et al. | |
| 2013/0310003 A1 | 11/2013 | Sadhvani et al. | |
| 2013/0311836 A1* | 11/2013 | Hurst et al. | 714/48 |
| 2014/0045483 A1* | 2/2014 | Whidden | 455/420 |
| 2014/0080467 A1 | 3/2014 | Urbanek | |
| 2014/0113610 A1 | 4/2014 | Ramprasad Satish et al. | |
| 2014/0206313 A1 | 7/2014 | Spanel et al. | |
| 2014/0228012 A1 | 8/2014 | Annan et al. | |
| 2014/0228042 A1 | 8/2014 | Annan et al. | |
| 2014/0274032 A1 | 9/2014 | Shipley et al. | |
| 2014/0373184 A1 | 12/2014 | Mahaffey et al. | |
| 2015/0065105 A1 | 3/2015 | Masterson et al. | |
| 2015/0111564 A1 | 4/2015 | Urbanek | |
| 2015/0111565 A1 | 4/2015 | Urbanek | |

FOREIGN PATENT DOCUMENTS

| | | |
|---|---|---|
| WO | WO2014123759 A1 | 8/2014 |
| WO | WO2014158430 A1 | 9/2014 |
| WO | WO2015030945 A1 | 3/2015 |
| WO | W02015060965 A2 | 4/2015 |

OTHER PUBLICATIONS

Notice of Allowance dated Nov. 22, 2014, U.S. Appl. No. 13/744,861, filed Jan. 18, 2013.

(56) References Cited

OTHER PUBLICATIONS

First Action Interview Pre-Interview Communication dated Oct. 22, 2014, U.S. Appl. No. 13/763,428, filed Feb. 8, 2013.
Allowance dated Dec. 29, 2014, U.S. Appl. No. 13/831,504, filed Mar. 14, 2013.
First Action Interview Pre-Interview Communication dated Nov. 20, 2014, filed May 21, 2013.
Foreign Communication from a Related Counterpart Application, "Preliminary Report on Patentability," dated Nov. 20, 2014, PCT/US13/40278 filed on May 9, 2013.
Foreign Communication from a Related Counterpart—International Search Report and Written Opinion, dated Dec. 17, 2014, PCT/US14/46773, filed on Jul. 16, 2014.
Foreign Communication from a Related Counterpart—International Search Report and Written Opinion, dated Dec. 30, 2014, PCT/US14/56778, filed Sep. 22, 2014.
Spanel, Robert L., et al., Patent Application entitled "Dynamic Remotely Managed SIM Profile" U.S. Appl. No. 14/522,586, filed Oct. 24, 2014.
Urbanek, Robert E., "Delivery of Branding Content and Customizations to a Mobile Communication Device", filed Sep. 22, 2014, International Serial No. PCT/US14/56778.
Koller, Gary D., et al., "Out of the Box Experience (OOBE) Country Choice Using Wi-Fi Layer Transmission," filed Oct. 31, 2014, U.S. Appl. No. 14/530,666.
Blinn, Benjamin P., et al. "System and Method of Efficient Mobile Device Network Brand Customization," filed Sep. 2, 2014, U.S. Appl. No. 14/475,399.
Notice of Allowance dated Apr. 26, 2012, U.S. Appl. No. 12/962,620, filed Dec. 7, 2010.
Notice of Allowance dated Nov. 2, 2012, U.S. Appl. No. 13/556,202, filed Jul. 24, 2012.
Notice of Allowance dated Jun. 11, 2013, U.S. Appl. No. 13/752,386, filed Jan. 28, 2013.
First Action Interview Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Notice of Allowance dated Aug. 9, 2013, U.S. Appl. No. 13/149,505, filed May 31, 2013.
First Action Interview Pre-Interview Communication dated Aug. 13, 2013, U.S. Appl. No. 13/335,941, filed Dec. 23, 2011.
Notice of Allowance dated Oct. 9, 2013, U.S. Appl. No. 13/335,941, filed Dec. 23, 2011.
First Action Interview Pre-Interview Communication dated Apr. 23, 2014, U.S. Appl. No. 13/622,234, filed Sep. 18, 2012.
Final Office Action dated Sep. 19, 2014, U.S. Appl. No. 13/622,234, filed Sep. 18, 2012.
FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.
FAIPP Pre-Interview Communication dated Jul. 16, 2014, U.S. Appl. No. 13/744,861, filed Jan. 18, 2013.
First Action Interview Pre-Interview Communication dated Apr. 3, 2014, U.S. Appl. No. 13/763,434, filed Feb. 8, 2013.
Final Office Action dated Aug. 19, 2014, U.S. Appl. No. 13/763,434, filed Feb. 8, 2013.
Office Action dated Aug. 7, 2014, U.S. Appl. No. 13/831,504, filed Mar. 14, 2013.
Foreign Communication from a Related Counterpart—International Search Report and Written Opinion, dated Feb. 29, 2012, PCT/US2011/063736, filed on Dec. 7, 2011.
Foreign Communication from a Related Counterpart Application, "Preliminary Report on Patentability", dated Jun. 20, 2013, PCT/US2011/063736 filed on Dec. 7, 2011.
Foreign Communication from a Related Counterpart—International Search Report and Written Opinion, dated Jul. 24, 2013, PCT/US13/40278, filed on May 9, 2013.
Foreign Communication from a Related Counterpart—International Search Report and Written Opinion, dated Nov. 14, 2013, PCT/US13/55023, filed on Aug. 15, 2013.
Foreign Communication From a Related Counterpart Application, International Search Report and Written Opinion dated Jan. 24, 2014, International Application No. PCT/US13/68981 filed on Nov. 7, 2013.
Foreign Communication from a Related Counterpart—International Search Report and Written Opinion, dated May 19, 2014, PCT/US14/13936, filed on Jan. 30, 2014.
Foreign Communication from a Related Counterpart—International Search Report and Written Opinion, dated May 14, 2014, PCT/US14/13939, filed on Jan. 30, 2014.
Delker, Jason R., "Loading Branded Media Outside System Partition", filed Oct. 30, 2013 U.S. Appl. No. 14/066,947.
Mauer, Brian D., et al., "Automatic Branding of Generic Applications", filed Jan. 10, 2013, U.S. Appl. No. 14/152,627.
Spanel, Robert L., et al., Patent Application entitled "Dynamic Remotely Managed SIM Profile" U.S. Appl. No. 13/744,847, filed Jan. 18, 2013.
Annan, Brandon C., et al.,"System and Method of Branding and Labeling a Mobile Device", filed Mar. 15, 2013, U.S. Appl. No. 13/844,104.
Annan, Brandon C., et al.,"Electronic Fixed Brand Labeling", filed Feb. 8, 2013, U.S. Appl. No. 13/763,443.
Ghoshal, Jagannath, et al.,"Rebranding a Portable Electronic Device While Maintaining User Data", filed May 22, 2013, U.S. Appl. No. 13/899,567.
Ghoshal, Jagannath, et al.,"System and Method for Retrofitting a Branding Framework into a Mobile Communication Device", filed May 21, 2013, U.S. Appl. No. 13/899,566.
Urbanek, Robert E., "Delivery of Branding Content and Customizations to a Mobile Communication Device", filed Oct. 23, 2013, U.S. Appl. No. 14/060,712.
Urbanek, Robert E., "Implementation of Remotely Hosted Branding Content and Customizations", filed Oct. 23, 2013, U.S. Appl. No. 14/085,474.
Urbanek, Robert E., "Subscriber Identity Module Virtualization", filed Nov. 20, 2013, U.S. Appl. No. 14/060,719.
Indurkar, Dhananjay, "System and Method of Branding a Device Independent of Device Activation", filed Jan. 24, 2014, U.S. Appl. No. 14/163,035.
Sumner, Bret D., "Directing Server Connection Based on Location Identifier", filed Aug. 15, 2013, U.S. Appl. No. 13/968,259.
Abou-El-Ella, Hassan, et al., "Segmented Customization Payload Delivery", filed Aug. 27, 2013, U.S. Appl. No. 14/010,518.
Sumner, Bret D., "Segmented Customization Package Within Distributed Server Architecture", filed Aug. 27, 2013, U.S. Appl. No. 14/010,522.
Masterson, Michelle E., et al., "System and Methods for Deferred and Remote Device Branding", filed Aug. 27, 2013, U.S. Appl. No. 14/010,524.
Masterson, Michelle E., et al., "System and Methods for Deferred and Remote Device Branding", filed Jul. 16, 2014, International Serial No. PCT/US14/46773.
Callan, Jeffery S., et al., "Delivery of Oversized Branding Elements for Customization", filed Nov. 6, 2013, U.S. Appl. No. 14/073,321.
Indurkar, Dhananjay, "Background Delivery of Device Configuration and Branding", filed Jan. 16, 2014, U.S. Appl. No. 14/157,507.
Ahn, Chul Jin, et al., "Separation of Client Identification Composition from Customization Payload to Original Equipment Manufacturer Layer", filed Nov. 8, 2013, U.S. Appl. No. 14/075,687.
Ghoshal, Jagannath, et al., "Multiple Carrier Partition Dynamic Access on a Mobile Device", filed Jun. 5, 2014, U.S. Appl. No. 14/297,429.
Indurkar, Dhananjay, "Activation Sequence Using Permission Based Connection to Network", filed Jan. 24, 2014, U.S. Appl. No. 14/163,041.
Ahn, Chul Jin, et al., "Customization for Preloaded Applications", filed Mar. 31, 2014, U.S. Appl. No. 14/231,718.
First Action Interview Pre-Interview Communication dated Sep. 22, 2014, U.S. Appl. No. 13/468,028, filed May 9, 2013.

(56) References Cited

OTHER PUBLICATIONS

Foreign Communication from a Related Counterpart—International Search Report and Written Opinion, dated Jun. 3, 2014,PCT/US14/16650, filed on Feb. 16, 2014.
Urbanek, Robert E., "Delivery of Branding Content and Customizations to a Mobile Communication Device", filed , 201, International Serial No. PCT/US14/56778.
First Action Interview Office Action dated Mar. 16, 2015, U.S. Appl. No. 13/468,028, filed May 9, 2013.
Office Action dated Mar. 2, 2015, U.S. Appl. No. 13/622,234, filed Sep. 18, 2012.
FAIPP Pre-Interview Communication dated Mar. 26, 2015, U.S. Appl. No. 14/522,586, filed Oct. 24, 2014.
FAIPP Pre-Interview Communication dated Apr. 8, 2015, U.S. Appl. No. 13/844,104, filed Mar. 15, 2013.
Notice of Allowance dated Mar. 20, 2015, U.S. Appl. No. 13/763,428, filed Feb. 8, 2013.
Notice of Allowance dated Mar. 26, 2015, U.S. Appl. No. 13/763,434, filed Feb. 8, 2013.
FAIPP Pre-Interview Communication dated Mar. 12, 2015, U.S. Appl. No. 13/972,827, filed Aug. 21, 2013.
Notice of Allowance dated Jan. 22, 2015, U.S. Appl. No. 13/899,566, filed May 21, 2013.
FAIPP Pre-Interview Communication dated Apr. 15, 2015, U.S. Appl. No. 14/060,712, filed Nov. 20, 2013.
FAIPP Pre-Interview Communication dated Mar. 4, 2015, U.S. Appl. No. 14/010,518, filed Aug. 27, 2013.
FAIPP Pre-Interview Communication dated Apr. 1, 2015, U.S. Appl. No. 14/010,522, filed Aug. 27, 2013.
FAIPP Pre-Interview Communication dated Mar. 10, 2015, U.S. Appl. No. 14/010,524, filed Aug. 27, 2013.
FAIPP Pre-Interview Communication dated Apr. 8, 2015, U.S. Appl. No. 14/157,507, filed Jan. 16, 2014.
Foreign Communication from a Related Counterpart—International Preliminary Report on Patentability, dated Apr. 2, 2015, PCT/US13/55023, filed Aug. 15, 2013.
Ghoshal, Jagannath, et al., "Multi-Step Mobile Device Initiation with Intermediate Partial Reset," filed Aug. 21, 2013, U.S. Appl. No. 13/972,827.
Delker, Jason R., et al. "Subscriber Identity Module (SIM) Card Initiation of Custom Application Launcher Installation on a Mobile Communication Device," filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
FAIPP Pre-Interview Communication dated Jun. 2, 2015, U.S. Appl. No. 14/152,627, filed Jan. 10, 2013.
Notice of Allowance dated Jul. 7, 2015, U.S. Appl. No. 14/522,586, filed Oct. 24, 2014.
FAIPP Pre-Interview Communication dated Apr. 23, 2014, U.S. Appl. No. 13/763,443, filed Feb. 8, 2013.
First Action Interview Office Action dated Jun. 16, 2014, U.S. Appl. No. 13/763,443, filed Feb. 8, 2013.
Office Action dated Jun. 16, 2015, U.S. Appl. No. 13/899,567, filed May 22, 2013.
Notice of Allowance dated May 7, 2015, U.S. Appl. No. 13/972,827, filed Aug. 21, 2013.
Notice of Allowance dated May 29, 2015, U.S. Appl. No. 14/085,474, filed Nov. 20, 2013.
Notice of Allowance dated May 8, 2015, U.S. Appl. No. 14/010,518, filed Aug. 27, 2013.
Notice of Allowance dated Jul. 8, 2015, U.S. Appl. No. 14/010,522, filed Aug. 27, 2013.
Notice of Allowance dated Apr. 28, 2015, U.S. Appl. No. 14/010,524, filed Aug. 27, 2013.
Restriction Requirement dated May 21, 2015, U.S. Appl. No. 14/073,321, filed Nov. 6, 2013.
FAIPP Pre-Interview Communication dated Jul. 8, 2015, U.S. Appl. No. 14/475,399, filed Sep. 2, 2014.
Amazon Kindle e-book reader, on public sale 2007, http://en.wikipedia.org/wiki/Amazon_Kindle. last accessed on Apr. 13, 2015.

* cited by examiner

DEVELOPMENT AND TESTING OF PAYLOAD RECEIPT BY A PORTABLE ELECTRONIC DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Portable electronic devices such as tablets, personal computers, laptop computers, mobile phones, personal digital assistants (PDAs) and the like may receive voice and/or data services from a telecommunications service provider. The telecommunications service provider may offer services and subscription plans under a brand or a number of brands. The subscription plans and services offered under one brand may be different than another brand, and the brand associated with the device may be reflected on the exterior components of the device such as the battery cover or screen border.

SUMMARY

In an embodiment, a method for sending payloads to a portable electronic device comprising: receiving, by a portable electronic device, a test file from a server; wherein the portable electronic device comprises a file in a memory and an application, wherein the file comprises a plurality of settings for at least some of a plurality of information nodes, and wherein each information node of the plurality of information node comprises at least one setting comprising at least two setting options. The embodiment further comprising: inputting, by the application, the test file, wherein inputting the test file changes at least one setting of at least some of the information nodes in the file from a first setting option to a second setting option; and sending, by the application, to the server, subsequent to the server sending the test file, a notification comprising a status of the test file.

In an embodiment, a system for sending payloads to a portable electronic device, comprising: a server comprising at least one data store; a portable electronic device comprising a test file in a memory, an application, and a plurality of information nodes, wherein each information node of the plurality of information node comprises at least one setting comprising at least two setting options; wherein the at least one data store comprises a plurality of test files, wherein each test file of the plurality of test files comprises a set of settings for at least some information nodes of the plurality of information nodes; wherein the server: sends at least one test file to the portable electronic device, and receives a notification as to the status of the test file.

In an alternate embodiment, a method for sending payloads to a portable electronic device comprising: sending, by a server comprising at least one data store, a test file of a plurality of test files from the at least one data store to a portable electronic device. The embodiment further comprising: receiving, by the server, at least one of: a notification that the test file was input by an application on the portable electronic device, wherein the notification comprises at least one of: a notification that the file was received, a notification that a plurality of information node settings on the portable device, each information node setting comprising at least two setting options, were changed from a first setting option to a second setting option, and a notification that the portable electronic device is operational after the plurality of information node settings are changed from the first setting option to the second setting option; and a notification that the test file was not one of received or input by the application. The embodiment further comprising: sending, by the server, in response to receiving the notification that the test file was one of not received or input by the application, a different test file of the plurality of test files to the portable electronic device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Telecommunications service providers may provide voice and/or data services to a variety of portable electronic devices including personal digital assistants (PDAs), tablets, personal computers, laptop computers, mobile phones, and e-readers. A telecommunications service provider may provide services under a plurality of brands, each of which may provide a different level of voice and/or data services domestically and/or internationally. A manufacturer (OEM) of portable electronic devices, as well as the telecommunications service provider, may want flexibility in how and when the brand is assigned to the portable electronic device. As such, using systems and methods disclosed here, the provider may be able to update brand-specific information remotely by pushing or sending payloads to the device. The OEM may have an interest in deferred brand assignment because deferred brand assignment may reduce the amount and type of packaging inventory maintained by the OEM as well as the cost of manufacture. In the past, device branding (e.g., the brand-specific software, the brand-specific media content such as ring tones, display wallpaper, video animations; references or links to application stores or customer care; etc.) lacked plasticity and was not readily mutable. Changing this branding was difficult, may have entailed firmware changes which may involve restrictions, for example, such as only occurring in the shop or during maintenance. These changes may not be able to be done remotely and may involve changing components such as the battery cover or other exterior attributes of the device where the device may have to be sent out for changeover or brought into a retail or service location. Using the systems and methods disclosed herein, not only can initial and refurbishment information be sent to and received by the device to change information node settings, but the setting options of information nodes can be changed, for example, to enable the device to operate under a different brand, to maximize operational functionality and/or send updates or change brands.

In an embodiment, the portable electronic device may comprise a file in the memory that has a plurality of information node settings for a plurality of information nodes on the portable electronic device. These settings may need to be changed and/or verified during the life of the portable electronic device, and, as discussed below, a "test" file or a "dummy" file may be used to test, verify, and/or validate the portable electronic device's ability to receive and execute payloads. Each information node comprises at least two characteristics, features, or attributes which may be referred to as options or setting options. These information node setting options ("setting options") may be changed when brand information is sent to the device during the initial use/sale of the device or during refurbishment, as well as during software/firmware updates. As such, the telecommunications provider and OEM may want to ensure that the device can receive, input, and operate after inputting a test file in order to determine if a device can mimic that behavior while in full operational mode when the device has been purchased and in some cases is associated with a subscription plan. The test file may comprise a plurality of setting options for at least some of the information nodes and may be stored along with other test files in a data store on a server. The information nodes may be associated with directory assistance, customer care, backgrounds, ringers, video delivery, other content delivery, mobile browser settings, voicemail, call waiting, alternate modes of functionality (i.e. airplane mode, roaming), visual voicemail, phone contacts/address book, call history, wallpaper, idle settings, sleep settings, power settings, and other settings for hardware and software on the portable electronic device.

Each information node may have two options for its setting, such as on/off, enable/disable, lock/unlock, and so on. The setting options may, in whole or in part, turn a feature or function of the device on or off, enable or disable the feature, lock or unlock the feature, or put the feature in sleep mode, and these setting options may depend on other conditions, for example, other node settings and the brand associated with the device. In an embodiment, each information node may have more than two settings or may have sub-nodes that have setting options as well.

In an embodiment, a brand may have at least one test file associated with it, and a test file may comprise settings options and combinations of setting options for information node that are used by the brand as well as those that may not currently be used by the brand. In an embodiment, at least one test file may be sent to a single device or to a representative number of devices from a lot, batch, shipment, or other group to ensure that the portable electronic devices are capable of receiving, inputting, and operating correctly after receipt. By using the systems and methods described herein, the telecommunications service provider can ensure that devices can receive and input payloads during normal operation, i.e. while the device is being used for voice and/or data services, and that the devices will remain operational after correctly inputting payloads. It is appreciated that a portable electronic device or group of devices of varying or similar types may be associated with at least one subscription plan offered by a brand of a telecommunications service provider and that the terms "normal operation" or "full operational mode" may be used to describe operation under a pre-paid, post-paid, or pay-as-you-go subscription plan.

By being able to test various combinations and permutations of information node setting options including tethered nodes, the telecommunications service provider can ensure that the device can receive payloads and input files comprising operational settings so that updates and even brand changes can occur without disruption of service to the user. Tethered nodes are nodes that are linked so that changing a first node from a first setting option to a second setting option also changes a second node from a first setting option to a second setting option, and in some cases vice-versa, i.e. it may not matter which node is changed first if more than one information node is tethered. In some embodiments, the tethered nodes may have a predetermined order of inputting changes. In addition, the ability of the telecommunications service provider to not only push updates but push (send) payloads that may change single or tethered information nodes enhances the user experience because the user's service is not interrupted, or is only temporarily interrupted to an extent that it is not noticeable to the user. This is in contrast to conventional methods where a device may be submitted to customer care for updates or connected to a computer system.

The systems and methods of sending payloads disclosed herein may be useful in a telecommunications service provider's system that uses branding virtually as opposed to on hardware. In an embodiment, the systems and methods disclosed herein use hands-free activation. Hands-free activation may occur when the portable electronic device receives the brand payload. The brand payload may tell the device the channel, the brand experience/user experience, device capabilities, and the applicable configuration. The device capabilities may include roaming, hotspots, tethering, contacts, and other features that may be configurable in whole or in part. The configurable feature information may comprise user interface viewing zone information, a mobile ID, visual voicemail, etc.

Figure 1:
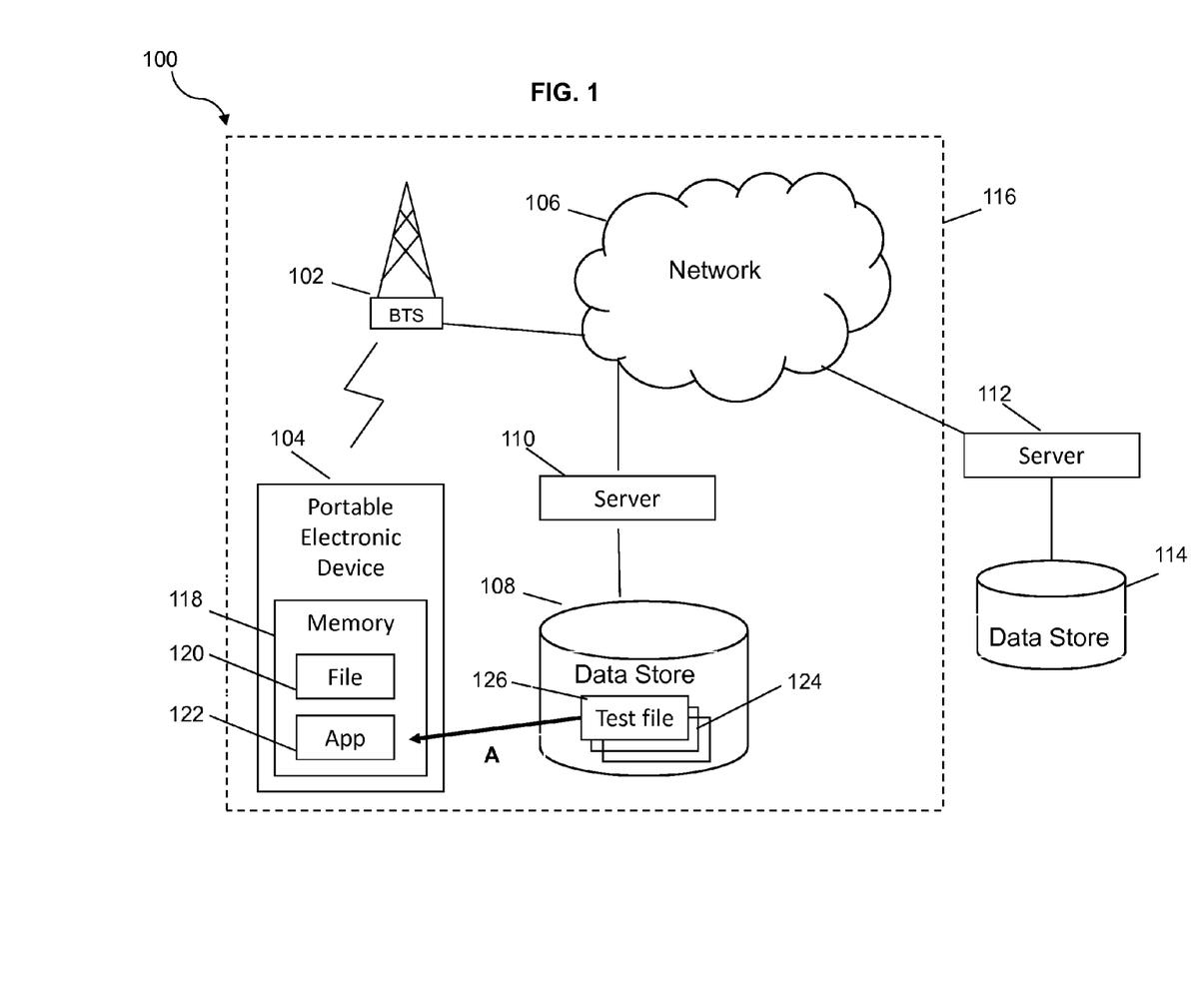
FIG. 1 illustrates a system according to an embodiment of the disclosure.

In an embodiment, the telecommunications service provider's system may be designed to use the same hardware and software across all channels including pre-paid plans, post-paid plans, pay as you go plans, as well as wholesale devices. The configuration and brand information can be delivered over the air at provisioning using platforms such as a platform used for configuration and general branding, a platform for user interface configuration, applications delivery, and brand experience, as well as the platform for application delivery for devices without a mobile ID FIG. 1 illustrates a system according to an embodiment of the disclosure. System 100 comprises a portable electronic device 104 that may be in wireless communication with a network 106 using a base transceiver station 102. The network 106 may comprise a plurality of servers 110, 112, each respectively associated with at least one data store 108 and 114. A test environment 116 may be established to ensure that the portable electronic device 104 can receive a payload, input the payload, and operate after the payload is input. In an embodiment, the test environment 116 may encompass the network 106, the BTS 102, the portable electronic device 104, the at least one server 110 and the associated data store 108. In an embodiment, this server 110 may be referred to as a test file server 110. It may comprise a plurality of test files 124, each test file 126 of the plurality of test files 124 comprising a set of setting options for a plurality of information nodes. Each information node comprises at least two characteristics, features, or attributes which may be referred to as setting options. The setting options may be, for example, on/off, enable/disable, on/off/sleep, yes/no, yes/no/conditional, and other options as appropriate for the information node in question.

In an embodiment, inputting the test file 126, which may also be referred to as a payload or a test payload, may change one or more information nodes from a first setting option to a second setting option. In an alternate embodiment, at least some of the information nodes to be changed by the test file 126 may be tethered. For example, if a first information node is associated with a contacts application on the device 104 and is linked to a calendar application on the device 104, changing an information node setting related to the contacts application may also change at least one information node setting on the calendar application. In an embodiment, one or more information nodes may be tethered. It is appreciated that the test file 126 may comprise information node setting options used by a brand that may be associated with the device 104, and that in some embodiments, information nodes or information node settings not used by a brand, or that may not be used by any brand of the telecommunications service provider, may be contained in the test file 126. In an embodiment, the information node may be a node as specified by the Open Mobile Alliance Device Management Working Group and may be referred to as an OMA DM node.

In an embodiment, a test file 126 may be associated with a particular brand. Inputting of the test file 126, which may also be referred to as a payload, may change a plurality of information node settings contained in a file 120 in a memory 118 of the portable electronic device 104. An information node may comprise a plurality of settings, and each setting may comprise a plurality of options, as discussed herein. The portable electronic device 104 may also comprise an application 122 capable of inputting the test file 126. In some embodiments, the application 122 receives and inputs the test file 126. In other embodiments, the applications 122 can send a notification to the server 110 indicating at least one of receipt or inputting of the file, and may also indicate whether the portable electronic device 104 operates subsequent to inputting the test file 122. It is appreciated that inputting the test file 126, by the application 122 or otherwise, if performed successfully, changes at least some setting options of at least some settings of information nodes, and that a file may be received and input successfully and the portable electronic device 104 may then be operational. Alternatively, the test file 126 may be input successfully but the portable electronic device 104 may not be subsequently operational.

Because each test file 126 may be associated with a particular brand, a plurality of brand-specific information reflected by the file 120 in the memory 118 of the device 104 including a brand experience and general branding information may be impacted by the test file 126. A brand experience, as compared to general branding information, may be more related to the user experience. For example, general branding information may comprise the communication channel is associated with the brand that will support voice and/or data services.

It is appreciated that a communication channel is a transmission medium that conveys information signals from at least one sender to at least one receiver. A brand experience may comprise user configurable options for the user interface and software, start-up and power-off animation, wallpaper, browser home page, as well as access to an application store and what applications are available/promoted to the user based upon the brand associated with the device. General branding and/or a brand experience or a combination of both may be sent to a device as a part of what may be referred to as a brand payload. Sending brand payloads may be beneficial because the dynamic channel allocation of inventory may reduce or eliminate sell-through risk while enabling volume purchasing and pricing. As such, it may be desirable for the telecommunications service provider to ensure, by sending at least one test file 126 to the portable electronic device 104, that the portable electronic device 104 is able to receive and input test files, and that the portable electronic device 104 can operate after a test file is input. Stated differently, sending test files may help ensure that a device 104 can correctly receive payloads, input payloads, and function subsequent to the inputting of a payload. This enables remote, wireless, updates to hardware and software, as opposed to updates that require a store visit or wired connection.

It is appreciated that the sending of the test file 126 to the portable electronic portable electronic device 104 is suggested by arrow "A" in FIG. 1. In some embodiments, the application 122 on the portable electronic device 104 is able to receive, input, and operate after inputting changes to the setting options of a plurality of information nodes. In addition, as each portable electronic device 104 may not have its own OEM SKU assigned, fewer SKUs may lower the cost of the device to the telecommunications service provider. It is appreciated that an OEM SKU may be the term used to refer to the stock-keeping unit assigned by the OEM that may be used for testing and traceability in the supply chain. Regulatory agencies such as the Federal Communications Commission (FCC) may have rules and regulations regarding testing for regulated devices or devices that use regulated systems, and that testing may be traceable to a device based at least on its OEM SKU.

Figure 2:
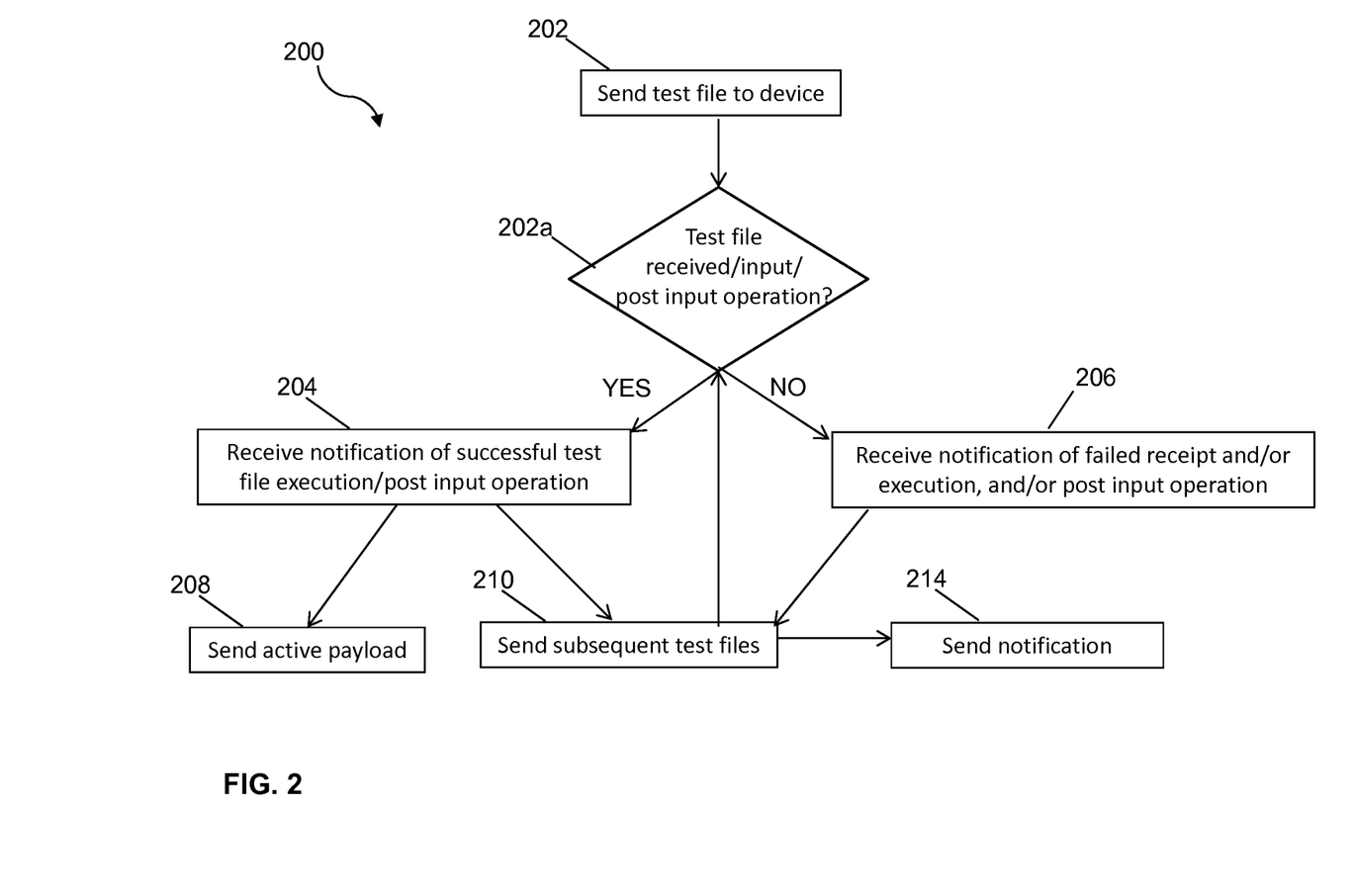
FIG. 2 illustrates a method according to an embodiment of the disclosure.

FIG. 2 illustrates a method for implementing aspects of the present disclosure. In method 200, a test file 126 such as in FIG. 1 is sent at block 202 to a portable electronic device such as portable electronic device 104 in FIG. 1. The test file 126 may be sent at block 202 by the server 110. At block 202a, if the test file 126 was received and input, and if the device is operable post-input, a notification may be received by the server 110 as to the successful sending of the test file 126 at block 204. In an embodiment, this notification may comprise a single notification and in an alternate embodiment this notification may comprise a plurality of notifications received by the server 110. This plurality of notifications may comprise a notification that the test file 126 was received, a notification that the test file was input, and a notification that the device is operable after the test file 126 is input. A single notification may reflect any or all of these aspects of the sending and inputting of the test file 126. It is appreciated that, in some embodiments, the server 110 may, subsequent to sending a test file 126 or subsequent test files, send a request to the application 122 for the status of the test file 126. The status of the test file 126 as discussed above is whether the test file 126 was received by the application 122, whether the test file 126 was input by the application 122, and/or if the portable electronic device 104 is operable after the test file 126 is input.

At block 208, in response to the server 110 receiving at least one notification, an active payload may be sent to the device portable electronic 104. It is appreciated that an active payload as discussed herein is a payload that portable electronic may, in addition to activation and provision or as a part of those processes, configure the device 104 for use under a brand and that an active payload may, in some cases, help enable use of the portable electronic device 104 outside of a test environment. In some embodiments, the active payload may authorize the portable electronic device 104 to operate on at network such as network 106 and to receive voice services and/or data services. In an alternate embodiment, at block 210, even if the test file 126 is received by the application 122 and the device is operable after the test file 126 is input, at least one subsequent test file (indicated by the plurality of test files 124 but not otherwise pictured) of the plurality of test files 124 may be sent. This subsequent (second) test file may be used to test different information node settings, to test different combinations of information node settings, to test tethered settings, to test a range of setting options for the node that may or may not be used by a brand, or combinations thereof. In this embodiment, the method may repeat step 202a for each test file 126 and proceed along the method depending upon the result of each test file as discussed below.

The test file 126 sent at block 202 may be received by the application 122 on the portable electronic device 104, input by the application 122, and the application 122 may confirm that the portable electronic device 104 is operable after the test file 126 is input. As discussed above, a notification of a failed attempt may be sent by the application 122 to the server 110 at block 206 that may indicate whether the file was not received, not input or not input correctly, or that the portable electronic device 104 is not operable after the test file 126 was input. In an embodiment, at least one subsequent test file 126 is sent at block 210 in response to the server 110 receiving the failure notification. In an embodiment, in response to the notification at block 206, the server 110 may send at least one subsequent test file at block 210 that is different than the test file 126 sent at block 202. The server 110 may continue to send different test files of the plurality of test files 124 until a predetermined number of test files in a row have been successfully input, where a test file is successfully input if the file is received, input, and the device is operational after input. In an embodiment, there may be a plurality of servers or a plurality of data stores, each used for a different brand's test files, and/or at least one server or data store used for test files that are not brand-specific but rather test setting options that may not be presently used by any brand.

This series of successful test file inputs may be constrained by time, number of attempts, types of information nodes, combinations of information nodes, as well as types and/or combinations of information node setting as well as tethered settings. In an alternate embodiment, the server 110 may send a predetermined number of test files 124 over a predetermined period of time until a predetermined total number of test files 124 have successfully been input or have failed to be input successfully. At block 214, a notification may be sent by the server 110 to another, different server such as the server 112 in the event that subsequent test files were not received as discussed above in the desired combination, period of time, series of successful attempts, etc.

It is appreciated from the discussion herein that the test file 126 is sent to the portable electronic device 104 at block 202 and the application 122 on the portable electronic device 104 receives and inputs the test file 126. Inputting the test file 126 changes at least some information node settings to settings that may be used by a brand and/or to settings that may not be used by a brand. By testing a plurality of these information nodes using various setting options and combinations of setting options, the ability of the portable electronic device 104 to accept payloads, input payloads, and operate correctly subsequent to a inputting a payload can be determined.

Figure 3:
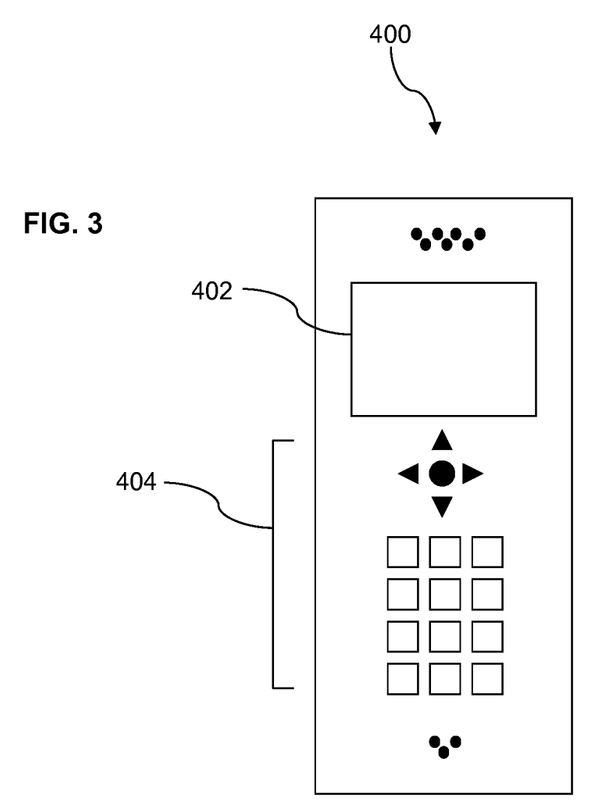
FIG. 3 depicts a portable electronic device operable according to an embodiment of the disclosure.

FIG. 3 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 4:
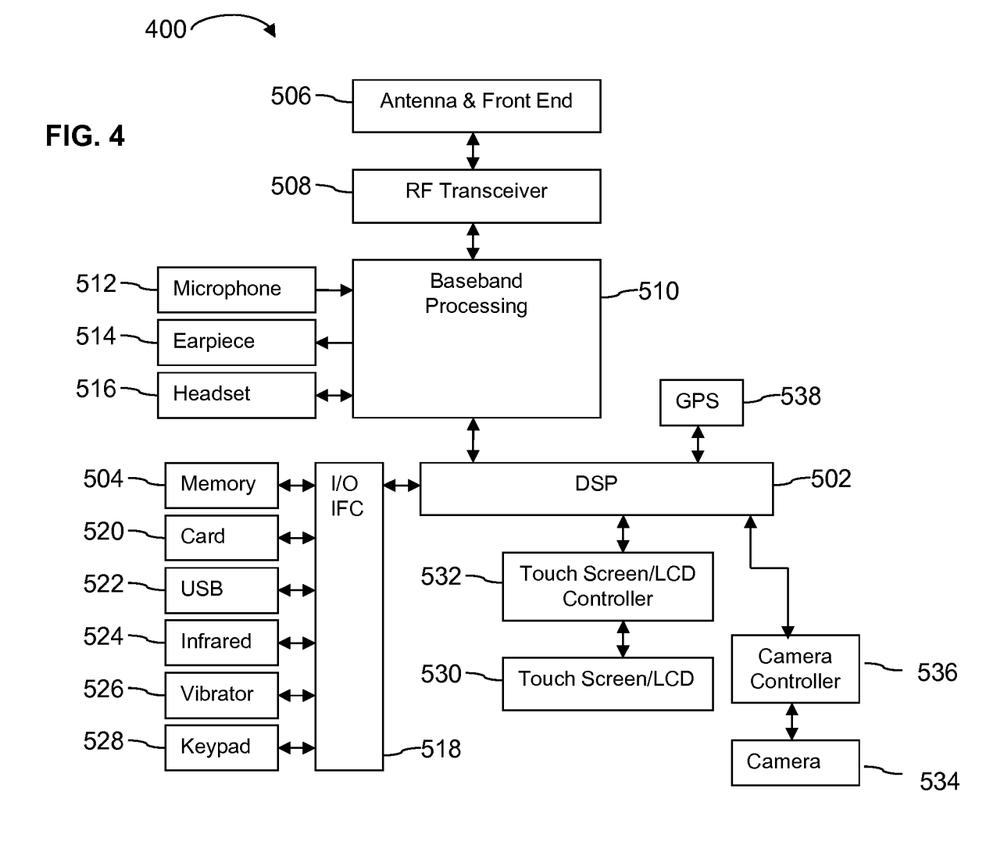
FIG. 4 shows a block diagram of a portable electronic device operable according to an embodiment of the disclosure.

FIG. 4 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 5A:
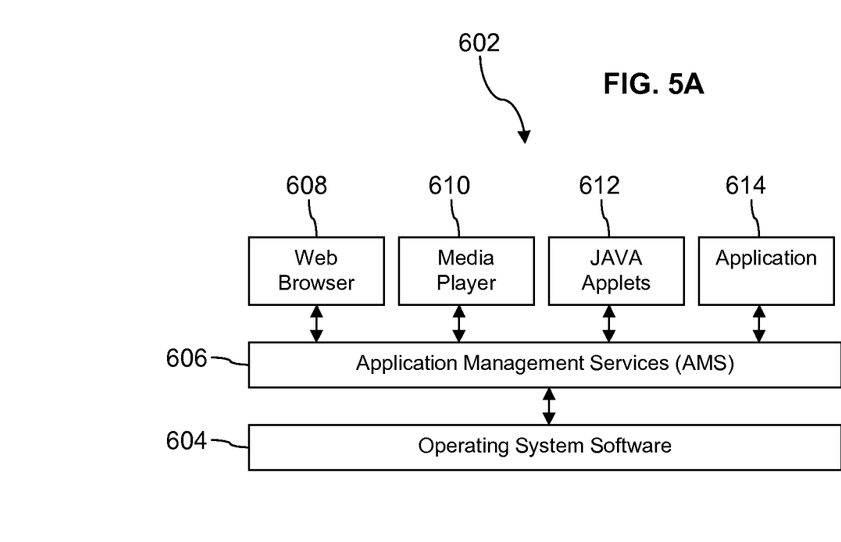
FIG. 5A illustrates a software environment that may be operable according to an embodiment of the disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 5A are a web browser application 608, a media player application 610, and JAVA applets 612. In addition, there may be an application 614 that may be similar to application 122 discussed with respect to FIG. 1. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 5B:
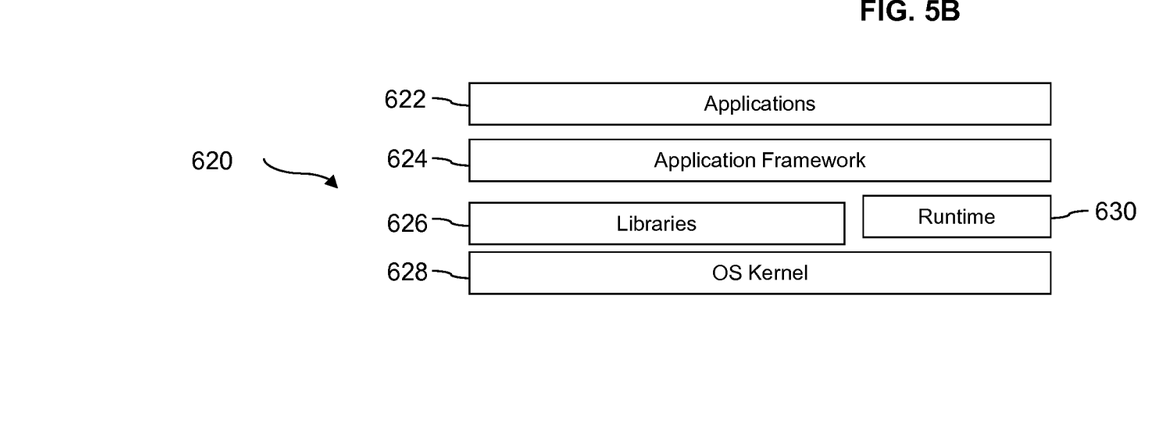
FIG. 5B illustrates an alternative software operable according to an embodiment of the disclosure.

FIG. 5B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
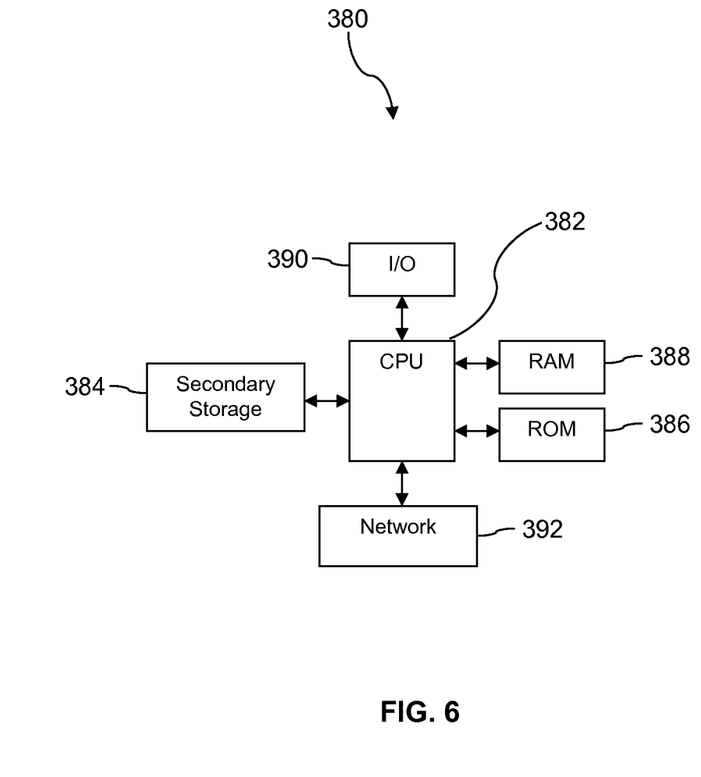
FIG. 6 illustrates a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for sending payloads to a portable electronic device comprising:
   receiving, by a portable electronic device, a test file from a server;
      wherein the portable electronic device comprises a file in a memory and an application,
      wherein the file comprises a plurality of settings for at least some of a plurality of information nodes, and
      wherein each information node of the plurality of information node comprises at least one setting comprising at least two setting options;
   inputting, by the application, the test file, wherein inputting the test file changes at least one setting of at least some of the information nodes in the file from a first setting option to a second setting option; and
   sending, by the application, to the server, subsequent to the server sending the test file, a notification comprising a status of the test file, wherein the status is based on the file setting changes.

2. The method of claim 1, wherein each information node of the plurality of information nodes are associated with at least one of hardware, software, and firmware.

3. The method of claim 1, wherein the status of the test file is that the test file was received by the application.

4. The method of claim 1, wherein the status of the test file is that the test file was input by the application.

5. The method of claim 1, wherein the status is that the portable electronic device is operable subsequent to inputting the test file.

6. The method of claim 1, wherein the status is that the test file was not input by the application.

7. The method of claim 1, wherein the status is that the portable electronic device is not operable subsequent to inputting the test file.

8. A system for sending payloads to a portable electronic device, comprising:
   a server comprising at least one data store;
   a portable electronic device comprising a test file in a memory, an application, and a plurality of information nodes, wherein each information node of the plurality of information node comprises at least one setting comprising at least two setting options;
   wherein the at least one data store comprises a plurality of test files, wherein each test file of the plurality of test files comprises a set of settings for at least some information nodes of the plurality of information nodes, wherein each test file is configured to change at least one setting of at least a first information node of a file stored in the memory of the portable electronic device from a first setting option to a second setting option;
   wherein the server:
      sends at least one test file to the portable electronic device, and receives a notification as to the status of the test file, wherein the status is based on the setting changes.

9. The system of claim 8, wherein a setting option at least one of turns a feature on, turns a feature off, enables a feature conditionally, and disables a feature conditionally.

10. The system of claim 8, wherein the status of the test file is one of the test file was received by the application, the test file was input by the application, and the portable electronic device is operational after the test file was input by the application.

11. The system of claim 10, wherein a setting of at least a second information node is changed from a first setting option to a second setting option when the application inputs the test file.

12. The system of claim 8, wherein the server sends the at least one test file as a part of a refurbishment process.

13. The system of claim 8, wherein each test file of the plurality of test files is associated with a brand of a telecommunications service provider, and wherein the at least one test file comprises at least some information node setting options used by the brand.

14. The system of claim 8, wherein each test file of the plurality of test files is associated with a brand of a telecommunications service provider, wherein the test file comprises at least some settings for information nodes that are not used by the brand.

15. A method for sending payloads to a portable electronic device comprising:
   sending, by a server comprising at least one data store, a test file of a plurality of test files from the at least one data store to a portable electronic device;
   receiving, by the server, at least one of:
      a notification that the test file was input by an application on the portable electronic device, wherein the notification comprises at least one of:
         a notification that the test file was received,
         a notification that a plurality of information node settings on the portable device, each information node setting comprising at least two setting options, were changed from a first setting option to a second setting option, wherein the test file is configured to change at least one information node setting of a file stored in the memory of the portable electronic device from the first setting option to the second setting option; and
         a notification that the portable electronic device is operational after the at least one information node settings are changed from the first setting option to the second setting option, wherein the notification is based on the setting changes;
      a notification that the test file was not one of received or input by the application; and
   sending, by the server, in response to receiving the notification that the test file was one of not received or input by the application, a different test file of the plurality of test files to the portable electronic device.

16. The method of claim 15, further comprising sending, by the server, in response to receiving a notification that the different test file was not input, a notification to an administrator.

17. The method of claim 15, wherein the server is associated with a telecommunications service provider.

18. The method of claim 17, wherein the telecommunications service provider comprises a plurality of brands.

19. The method of claim 18, wherein each test file is associated with a configuration of the plurality of information node settings of a brand of the plurality of brands.

20. The method of claim 15, further comprising receiving, by the server, a notification that the portable electronic device is not operable after the test file is input.

* * * * *